United States Patent [19]

Sugiyama

[11] Patent Number: 5,298,827
[45] Date of Patent: Mar. 29, 1994

[54] PERMANENT MAGNET TYPE DYNAMOELECTRIC MACHINE ROTOR

[75] Inventor: Takeshi Sugiyama, Himeji, Japan

[73] Assignee: Mitsubishi Denki Kabushiki Kaisha, Tokyo, Japan

[21] Appl. No.: 981,523

[22] Filed: Nov. 25, 1992

[30] Foreign Application Priority Data

Nov. 26, 1991 [JP] Japan .................. 3-337778

[51] Int. Cl.[5] .......................................... H02K 21/12
[52] U.S. Cl. ................................ 310/156; 310/181; 310/261
[58] Field of Search ............... 310/156, 263, 261, 181, 310/271, 264, 265, 267, 162; 318/701

[56] References Cited

U.S. PATENT DOCUMENTS

| | | | |
|---|---|---|---|
| 2,475,776 | 1/1947 | Brainard . | |
| 2,651,733 | 9/1953 | Stark | 310/156 |
| 3,230,404 | 1/1966 | Graham | 310/263 |
| 4,127,786 | 11/1978 | Volkrodt | 310/156 |
| 4,302,693 | 11/1981 | Burgmeier | 310/156 |
| 4,339,874 | 7/1982 | Mc'Carty | 310/156 |
| 4,445,062 | 4/1984 | Glaser | 310/156 |
| 4,797,602 | 1/1989 | West | 310/156 |
| 5,063,318 | 11/1991 | Anderson | 310/156 |
| 5,128,575 | 7/1992 | Heidelberg | 310/156 |

FOREIGN PATENT DOCUMENTS

| | | |
|---|---|---|
| 0188231 | 1/1986 | European Pat. Off. . |
| 1043488 | 4/1956 | Fed. Rep. of Germany . |
| 1400581 | 4/1964 | France . |
| 39355 | 4/1989 | Japan . |
| 9207407 | 4/1992 | Japan . |
| 120902 | 11/1918 | United Kingdom . |

OTHER PUBLICATIONS

Zeitschrift Fur Angewandtw Physik, vol. 30, No. 1, 1970, Berlin pp. 99–102.
Patent Abstracts of Japan, JP61094548 May 13, 1986; JP3222641 Oct. 1, 1991; JP1209942 Aug. 23, 1989; JP 60043051 Mar. 7, 1985; and JP1103145 Apr. 20, 1989.
Apsit, Pole terminal Byulleten izobreteniy, 1959, No. 9, p. 26, published Jun. 13, 1958; Soviet Union.

Primary Examiner—R. Skudy
Attorney, Agent, or Firm—Sughrue, Mion, Zinn, Macpeak & Seas

[57] ABSTRACT

A dynamoelectric machine rotor comprising a plurality of substantially trapezoidal prism-shaped permanent magnets mounted on a magnetic yoke. Each of the magnets has magnetic pole faces in circumferential plane, side surfaces in a plane perpendicular to the rotary shaft and a front and a rear skewed surface slanted in different directions with respect to a plane parallel to the shaft. The magnetic pole faces of the magnets have alternating magnetic polarities in the circumferential direction, and the front and rear skewed surfaces of the neighboring permanent magnets are in parallel to each other. A ferromagnetic end material may be attached on the magnetic pole face of the magnets, and a ferromagnetic side material may be attached to at least a front and a rear skewed side surfaces of the magnets for increasing of the magnetization of the magnets by a stator flux. Also, slits may be provided in the magnetic yoke where the magnets are mounted for increasing a reluctance of a magnetic circuit passing through a common magnet.

7 Claims, 3 Drawing Sheets

PERMANENT MAGNET TYPE DYNAMOELECTRIC MACHINE ROTOR

BACKGROUND OF THE INVENTION

This invention relates to a dynamoelectric machine rotor and, more particularly, to a dynamoelectric machine rotor with a permanent magnet type field magnets for use in a synchronous machine.

FIG. 11 illustrates one example of a conventional dynamoelectric machine rotor or permanent magnet type disclosed in Japanese Utility Model Laid-Open No. 3-39355. In FIG. 11, reference numeral 1 designates a rotor 1 in which a permanent magnet 3 magnetized in an axial direction is secured on a rotary shaft 2. On the both sides of the permanent magnet 3, magnetic yokes 4 and 5 are secured to the rotary shaft 2. Claw poles 4a and 5a axially extend from the outer circumference of the magnetic yokes 4 and 5. The axial dimension of a surface of the claw poles 4a and 5a facing to the stationary iron core (not shown) through an air gap is arranged to vary in a sine wave fashion in the circumferential direction. This causes the intersecting magnetic flux passing through the stator winding (not shown) to vary as a sine wave in accordance with the change of the facing surface of the claw poles 4a and 5a.

In the conventional permanent magnet type rotor as above described, the magnetic flux generated from the permanent magnet 3 passes through the magnetic yoke 4, the claw pole 4a and an air gap and into the stationary iron core so that it intersects with the stationary winding. In this case, since a magnetic circuit extending from the magnetic yoke 4 to the outer circumference surface facing the inner surface of the stator iron core of the claw pole 4a has a different cross-sectional area and a different magnetic path length, the magnetic fluxes generated from the outer surface of the air gap are not constant. Therefore, even when the claw poles are modified into a sine wave configuration, the magnetic flux intersecting with the stator winding does not accurately vary as a sine wave and is distorted, This causes a non-smooth varying rotation torque when the rotor is used in an electric motor and generation of magnetic noise when the rotor is used in a generator. Also, the outer circumference of the claw poles 4a and 5a have different magnetic flux densities, i.e., an increased magnetization portion and a decreased magnetization portion appear due to the armature reaction by the energized stator windings, so that the output power is disadvantageously decreased.

SUMMARY OF THE INVENTION

Accordingly, one object of the present invention is to provide a dynamoelectric machine rotor free from the above-discussed drawbacks of the conventional dynamoelectric machine rotor.

Another object of the present invention is to provide a dynamoelectric machine rotor in which the output torque change and the magnetic noise are decreased.

Another object of the present invention is to provide a dynamoelectric machine rotor in which the output power is increased and the demagnetization is decreased.

With the above objects in view, the present invention resides in a dynamoelectric machine rotor which comprises a rotary shaft having a central axis, a magnetic yoke mounted on the rotary shaft for rotation therewith, and a clamp ring disposed around the magnetic pole faces of permanent magnets for mechanically maintaining the permanent magnets on the magnetic yoke. The dynamoelectric machine rotor also comprises a plurality of permanent magnets mounted on the magnetic yoke at a substantially equal radial dimension and substantially equal circumferential intervals with respect to the central axis of the rotary shaft. Each of the permanent magnets having magnetic pole faces in a circumferential plane, and the magnetic pole faces of the permanent magnets having an alternating magnetic polarities in the circumferential direction, and side surfaces in a plane perpendicular to the central axis of the rotary shaft. The permanent magnet also has front and a rear skewed surfaces generally slanted in different direction with respect to a plane parallel to the central axis, and the front and rear skewed surfaces of neighboring permanent magnets of the permanent magnets are parallel to each other.

Each of the permanent magnets may be substantially prism-shaped and has a substantially trapezoidal cross section which may have a shorter side having a length of from 27 to 40 percent of a length of a longer side. The trapezoidal cross section may be rounded at its corners of the shorter sides of the trapezoid.

The dynamoelectric machine rotor may also have a ferromagnetic material attached between the magnetic pole faces of the permanent magnets and the clamp ring and a ferromagnetic material attached to each of the permanent magnets on at least a front and a rear skewed side surfaces for allowing a magnetic flux from a stator to cause the increasing of the magnetization of the permanent magnets. A slit may be provided in the magnetic yoke at a portion to which the permanent magnets are mounted for increasing a magnetic reluctance of a magnetic circuit passing through a common permanent magnet.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
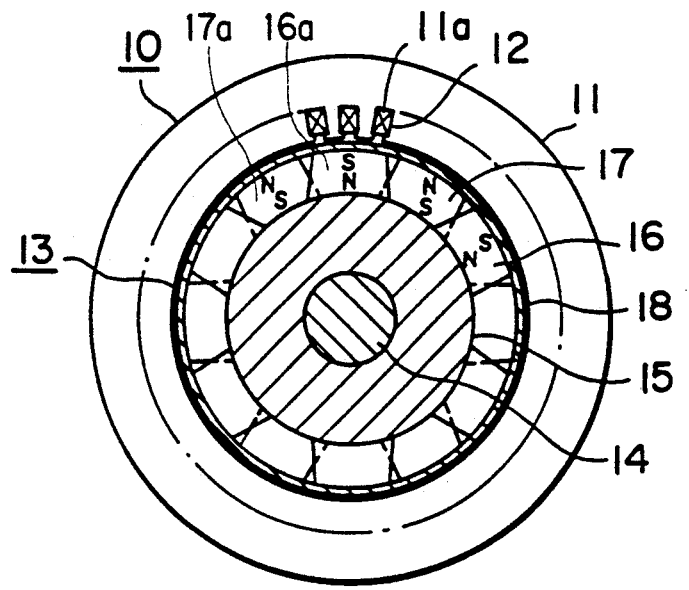
FIG. 1 is a cross-sectional view of a dynamoelectric machine rotor of one embodiment of the present invention.

FIG. 1 illustrates an alternating current generator comprising a hollow stator 10 and a permanent magnet field magnet type rotor 13 of the present invention. The rotor 13 is rotatably disposed within the stator 10 which comprises a stator windings 12 inserted into slots 11a of the stator iron core 11.

The rotor 13 comprises a rotary shaft 14, a substantially drum-shaped magnetic yoke 15 concentrically mounted on the rotary shaft 14 for rotation therewith, a plurality of permanent magnets 16 and 17 mounted on the magnetic yoke 15 at a substantially equal radial dimension and substantially equal circumferential intervals with respect to the rotary shaft 14, and a clamp ring 18 disposed around the permanent magnets 16 and 17 for mechanically rigidly maintaining them on the magnetic yoke 15.

Figure 2:
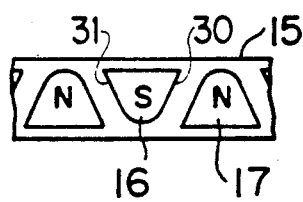
FIG. 2 is an extended view of the permanent magnets illustrating the arrangement of the permanent magnets on the outer circumference of the magnetic yoke.

Each of the permanent magnets 16 and 17 is a substantially prism-shaped member and has a substantially trapezoidal cross section rounded at its corners defined by shorter sides of the trapezoid as best shown in FIG. 2. The opposite ends of the permanent magnets 16 and 17 define magnetic pole faces 16a and 17a which lie in an imaginary circumferential cylindrical plane concentric to the outer circumferential surface of the drum-shaped magnetic yoke 15, and the magnetic pole faces 16a and 17a of the permanent magnets 16 and 17 have opposite magnetic polarities N and S which appear alternatively in the circumferential direction. In the illustrated embodiment, the magnetic pole faces 16a of the permanent magnets 16 are in the S polarity at its radially outer ends, and the magnetic pole faces 17a of the permanent magnets 17 disposed between the magnets 16 are in the N polarity at its radially outer ends. Thus, the permanent magnets 16 and 17 mounted on the outer circumferential surface of the magnetic yoke 15 provide a magnetic field of an alternative magnetic polarity in the circumferential direction. Side surfaces of the permanent magnets 16 and 17 are in a plane perpendicular to the rotational axis of the rotary shaft 14. The permanent magnets 16 and 17 have a front skewed surface 30 and a rear skewed surface 31 generally slanted in different direction with respect to a plane parallel to the axis of rotation of the rotary shaft 14, and the front and rear skewed surfaces 30 and 31 of the neighboring permanent magnets 16 and 17 are disposed in parallel to each other.

In other words, the permanent magnets 16 and 17 are circumferentially alternatingly mounted on the outer periphery of the magnetic yoke 15 so that not only their magnetic polarity is alternative but also their rounded shorter side and the rounded longer side of the trapezoidal cross section are alternative.

With the above construction, since the permanent magnets 16 and 17 are mounted on the outer circumferential surface of the magnetic yoke 15 with the magnetic pole faces 16a and 17a are lying in a circumferential plane directly facing toward the air gap defined between the stator 10 and the rotor 13 and since the magnetic flux entering into the stator core 11 is a section of a predetermined sine wave. Therefore, a smooth rotating torque can be obtained when the rotor is applied to an electric motor and the generation of magnetic noise is prevented when the rotor is applied to a generator.

Figure 3:
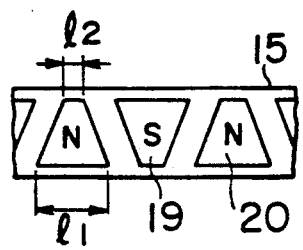
FIG. 3 is an extended view of the permanent magnets illustrating the arrangement of the permanent magnets on the outer circumference of the magnetic yoke.
Figure 4:
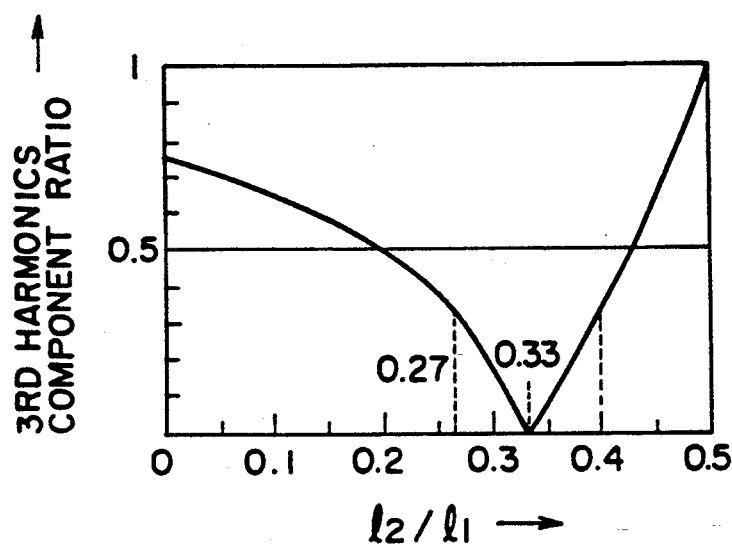
FIG. 4 is a graph illustrating how the proportion of the third harmonic component changes as the ratio of the shorter side to the longer side changes.

FIG. 3 illustrates a modification of the trapezoidal cross section of a permanent magnets 19 and 20 which has a shorter side having a length $l_2$ of from 27 to 40 percent of a length $l_1$ of a longer side. Preferably, the length $l_2$ is about 33 percent of the length $l_1$. It is seen in this example that the corners defined between the sides are not rounded. In other respects, the arrangement is similar to those illustrated and described in conjunction with FIGS. 1 and 2. It is generally known that, when a three-phase a.c. voltage is supplied to a stator windings, what is to be reduced is the third harmonic component of the intersecting magnetic flux. As clearly seen from the graph of FIG. 4 which illustrates the third harmonic component ratio, which is illustrated as 1 when $l_2$ is 0.5, as plotted against the change in the ratio of the shorter side length $l_2$ relative to the longer side length $l_1$, the third harmonic component of the intersecting magnetic flux becomes small when the $l_2/l_1$ is between 0.27 and 0.4 and the similar advantageous results as in the case where the sine wave-shaped magnets are used can be obtained.

Figure 5:
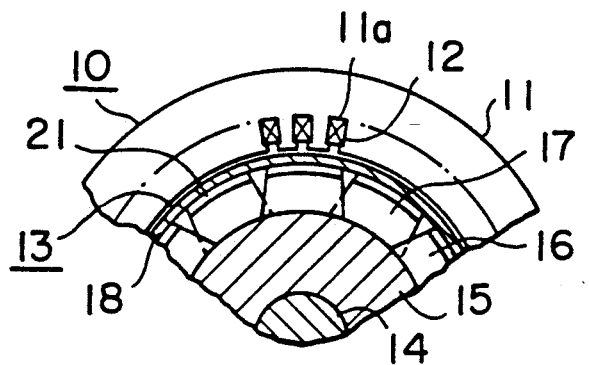
FIG. 5 is a fragmental cross-sectional view of a dynamoelectric machine rotor of another embodiment of the present invention.

FIG. 5 illustrates another embodiment of the dynamoelectric machine rotor of the present invention in which the rotor 13 further comprises a ferromagnetic material 21 attached between the outer magnetic pole faces 16a and 17a of each of the permanent magnets 16 and 17 and the clamp ring 18. The ferromagnetic material 21 may be made of a high magnetic permeability soft iron. In this arrangement, since the magnetic flux generated by the stator windings 12 passes through the ferromagnetic material 21 and not through the permanent magnets 16 and 17, the reduction of the magnetization of the permanent magnets 16 and 17 can be prevented under the circumstances in which the armature reaction is very high. Also, by increasing the magnetic flux amount within the air gap, the output power can be increased.

Figure 6:
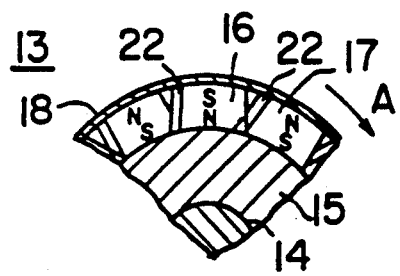
FIG. 6 is a fragmental cross-sectional view of a dynamoelectric machine rotor of a further embodiment of the present invention.
Figure 7:
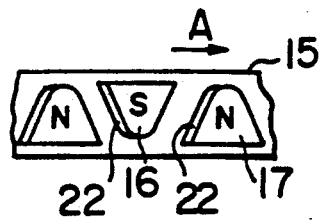
FIG. 7 is an extended view of the permanent magnets illustrating the arrangement of the permanent magnets on the outer circumference of the magnetic yoke of FIG. 6.

FIGS. 6 and 7 illustrates another embodiment of the present invention in which the dynamoelectric machine rotor for use in a generator comprises a ferromagnetic material 22 attached to each of the permanent magnets 16 and 17 on a rear skewed side surfaces for allowing a magnetic flux from a stator to cause the increase of the magnetization of the permanent magnets 16 and 17. The side surfaces of the permanent magnets 16 and 17 are rear side surfaces in the sense that they are rear side as viewed in the direction of rotation of the rotor indicated by an arrow A.

Figure 8:
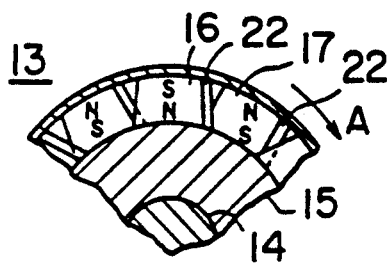
FIG. 8 is a fragmental cross-sectional view of a dynamoelectric machine rotor of a still another embodiment of the present invention.
Figure 9:
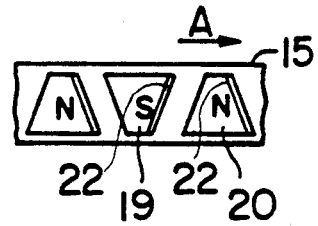
FIG. 9 is an extended view of the permanent magnets illustrating the arrangement of the permanent magnets on the outer circumference of the magnetic yoke of FIG. 8.

FIGS. 8 and 9 illustrate another embodiment of the present invention in which the dynamoelectric machine rotor comprises a ferromagnetic material 22 attached to each of the permanent magnets 16 and 17 on a front skewed side surfaces for allowing a magnetic flux from a stator to cause the increase of the magnetization of the permanent magnets 16 and 17. The ferromagnetic materials 22 are attached to the sides of the magnets 16 and 17 which are front side as viewed in the direction of rotation of the rotor shown by the arrow A.

In these embodiments, the ferromagnetic materials 22 are attached to the rear or front side surfaces of the permanent magnets 16 and 17 or 19 and 20, so that the magnetic fluxes extending from the stator coils 12 are forced to pass through these ferromagnetic materials 22, whereby the reduction of the magnetization of the permanent magnets 16 and 17 or 19 and 20 can be prevented and the output power can be increased.

Figure 10:
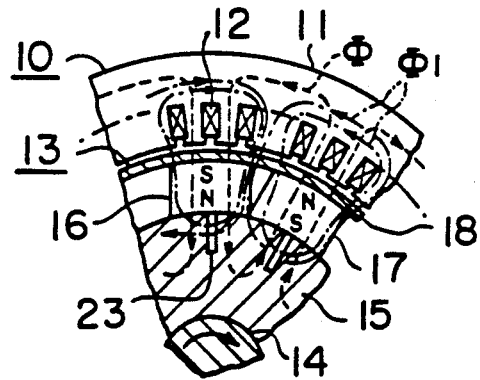
FIG. 10 is a fragmental cross-sectional view of a dynamoelectric machine of another embodiment.
Figure 11:
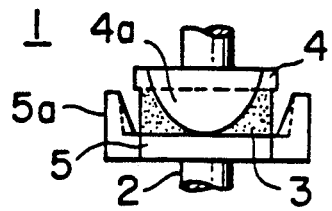
FIG. 11 is a side view of the rotor of the conventional design.

FIG. 10 illustrates a further embodiment of the dynamoelectric machine rotor of the present invention which comprising a slit 23 formed in the magnetic yoke 15 at a portion to which the respective permanent magnets 16 and 17 are mounted for increasing a magnetic reluctance of a magnetic circuit passing through a common permanent magnets 16 and 17. More particularly, the slit 23 is radially and axially extending from the outer circumferential surface of the magnetic yoke 15 and positioned at the center of each of the permanent magnets 16 or 17. With this arrangement, the magnetic flux $\phi$ generated by the permanent magnets 16 and 17 is allowed to freely pass through the magnetic circuit while the magnetic flux $\phi$ 1 generated by the stator windings 12 and other wise flows through into the rotor 13 is prevented by the magnetic reluctance of the slits 23, whereby the armature reaction can be decreased. If desired, the slits 23 may be filled with a non-magnetic material.

What is claimed is:

1. A dynamoelectric machine rotor comprising:
   a rotary shaft having a central axis;
   a magnetic yoke mounted on said rotary shaft for rotation therewith;
   a plurality of permanent magnets mounted on said magnetic yoke at a substantially equal radial dimension and substantially equal circumferential intervals with respect to said central axis of said rotary shaft, each of said permanent magnets having magnetic pole faces in a circumferential plane, side surfaces in a plane perpendicular to said central axis of said rotary shaft and a front and a rear skewed surface generally slanted in a direction which does not lie in a plane parallel to said central axis, said magnetic pole faces of said permanent magnets having alternating magnetic polarities in a circumferential direction, and said front and rear skewed surfaces of neighboring permanent magnets of said permanent magnets are substantially in parallel to each other; and
   each of said permanent magnets having a trapezoidal cross section, said trapezoidal cross section having a short side and a long side, a length of said shorter side being from 27 to 40 percent of a length of said longer side;
   a clamp ring disposed around said magnetic pole faces of said permanent magnets for mechanically maintaining said permanent magnets on said magnetic yoke.

2. A dynamoelectric machine rotor as claimed in claim 1, wherein each of said permanent magnets is substantially prism-shaped and has a substantially trapezoidal cross section.

3. A dynamoelectric machine rotor as claimed in claim 1, wherein each of said permanent magnets is substantially prism-shaped and has a substantially trapezoidal cross section rounded at it corners of the shorter sides of the trapezoid.

4. A dynamoelectric machine rotor as claimed in claim 1, further comprising a ferromagnetic material attached between said magnetic pole faces of said permanent magnets and said clamp ring.

5. A dynamoelectric machine rotor as claimed in claim 1, further comprising a ferromagnetic material attached to each of said permanent magnets on at least a front and a rear skewed side surfaces for allowing a magnetic flux from a stator to cause the increasing of the magnetization of said permanent magnets.

6. A dynamoelectric machine rotor as claimed in claim 1, further comprising a slit formed in said magnetic yoke at a portion to which said permanent magnets are mounted for increasing a magnetic reluctance of a magnetic circuit passing through a common permanent magnet.

7. A dynamoelectric machine rotor comprising:
   a rotary shaft having a central axis;
   a magnetic yoke mounted on said rotary shaft for rotation therewith;
   a plurality of substantially trapezoidal prism-shaped permanent magnets mounted on said magnetic yoke at a substantially equal radial dimension and substantially equal circumferential intervals with respect to said central axis of said rotary shaft, each of said permanent magnets having magnetic pole faces in a circumferential plane, side surfaces in a plane perpendicular to said central axis of said rotary shaft and a front and a rear skewed surface generally slanted in a direction which does not lie on a plane parallel to said central axis, said magnetic pole faces of said permanent magnets having alternating magnetic polarities in a circumferential direction, and said front and rear skewed surfaces of neighboring permanent magnets of said permanent magnets are substantially in parallel to each other;
   each of said permanent magnets having a trapezoidal cross section, said trapezoidal cross section having a short side and a long side, a length of said shorter side being from 27 to 40 percent of a length of said longer side;
   a clamp ring disposed around said magnetic pole faces of said permanent magnets for mechanically maintaining said permanent magnets on said magnetic yoke;
   a ferromagnetic end material attached between each of said magnetic pole faces of said permanent magnets and said clamp ring;
   a ferromagnetic side material attached to each of said permanent magnets on at least a front and a rear skewed side surface for allowing a magnetic flux from a stator to cause an increase in magnetization of said permanent magnets; and
   a slit formed in said magnetic yoke at a portion to which said permanent magnets are mounted for increasing a magnetic reluctance of a magnetic circuit passing through said permanent magnets.

* * * * *